United States Patent
Baker et al.

(10) Patent No.: US 8,279,827 B2
(45) Date of Patent: Oct. 2, 2012

(54) METHOD FOR TRANSMITTING CHANNEL QUALITY REPORT IN A DISCONTINUOUS TRANSMISSION SCHEME, PRIMARY AND SECONDARY STATIONS THEREFOR

(75) Inventors: Matthew Peter John Baker, Canterbury (GB); Timothy James Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 307 days.

(21) Appl. No.: 12/596,503

(22) PCT Filed: Apr. 21, 2008

(86) PCT No.: PCT/IB2008/051522
§ 371 (c)(1),
(2), (4) Date: Feb. 5, 2010

(87) PCT Pub. No.: WO2008/132650
PCT Pub. Date: Nov. 6, 2008

(65) Prior Publication Data
US 2010/0135230 A1    Jun. 3, 2010

(30) Foreign Application Priority Data

Apr. 25, 2007 (EP) ..................................... 07300980
May 4, 2007 (EP) ..................................... 07301018

(51) Int. Cl.
*H04W 4/00* (2009.01)
(52) U.S. Cl. ...................................................... 370/330
(58) Field of Classification Search ........................ None
See application file for complete search history.

(56) References Cited

U.S. PATENT DOCUMENTS

| | | | | | |
|---|---|---|---|---|---|
| 6,011,786 | A | * | 1/2000 | Dent | 370/330 |
| 6,144,855 | A | * | 11/2000 | Slovin | 455/432.1 |
| 6,792,053 | B1 | * | 9/2004 | Vainio et al. | 375/341 |
| 7,983,674 | B2 | * | 7/2011 | Julian et al. | 455/436 |
| 2007/0149249 | A1 | * | 6/2007 | Chen et al. | 455/561 |

FOREIGN PATENT DOCUMENTS

| | | |
|---|---|---|
| WO | 02/078211 A2 | 10/2002 |
| WO | 03/023995 A1 | 3/2003 |
| WO | 2004/102828 A1 | 11/2004 |

OTHER PUBLICATIONS

"CQI Reporting Scheme for REL-7 FDD MIMO", 3rd Generation Partnership Project; Mobile Competence Centre, R1-062996, Oct. 13, 2006, p. 1-2.

"CQI Reporting for REL-7 FDD MIMO", 3rd Generation Partnership Project, Mobile Competence Centre, Seoul, Korea, R1-062680, Oct. 13, 2006.

(Continued)

*Primary Examiner* — Raj Jain

(57) ABSTRACT

A method is disclosed for transmitting channel quality reports periodically from a secondary station to a primary station, wherein transmission of a control channel is carried out discontinuously with a predetermined periodic transmission phase, and wherein said method comprises the following steps. Scheduling the transmission of a transmission sequence of channel quality reports of at least a first type and a second type according to a predetermined pattern. Estimating the number of channel quality reports of the second type scheduled during the transmission phases of a predetermined time window. Amending the transmission sequence by replacing at least one channel quality report scheduled to be of the first type with a channel quality report of the second type if the number of second type channel quality reports scheduled during the transmission phases of the predetermined time window is below a predetermined threshold. Transmitting the amended sequence to the primary station.

16 Claims, 3 Drawing Sheets

OTHER PUBLICATIONS

"CQI for REL-7 FDD MIMO Scheme", 3rd Generation Partnership Project, Mobile Competence Centre, Tallinn, Estonia, R1-061954, Aug. 28, 2006.

"CQI Reporting When MIMO and CPC Are Both Configured", 3rd Generation Partnership Project, Mobile Competence Centre, Kobe, Japan, May 7, 2007.

* cited by examiner

METHOD FOR TRANSMITTING CHANNEL QUALITY REPORT IN A DISCONTINUOUS TRANSMISSION SCHEME, PRIMARY AND SECONDARY STATIONS THEREFOR

FIELD OF THE INVENTION

The present invention relates to a method for transmitting channel quality reports in a communication network, like a mobile telecommunication network. This invention is for instance applicable to UMTS telecommunication network.

BACKGROUND OF THE INVENTION

A conventional secondary station (or a mobile station or user equipment (UE)) that is configured to receive HSDPA (High Speed Downlink Packet Access) data packets transmits Channel Quality Indicator (CQI) feedback to the primary station (or a base station, or a NodeB) on a periodic cycle whose period is configured by the network.

In CPC mode (Continuous Packet Connectivity), the control channel overhead is reduced between data packets, so that control signalling is only sent in periodic bursts. This is known as Discontinuous Transmission (or DTX), wherein the control signalling is transmitted intermittently. The reception may also be discontinuous, known as Discontinuous Reception (or DRX).

A communication system comprising a secondary station and a primary station may operate with multiple antennas in a Multiple-Input Multiple-Output (MIMO) mode.

In both MIMO and non-MIMO modes, it is advantageous for the network to align the channel quality indicator feedback cycle period k with the DTX and DRX cycles of the CPC mode.

If this alignment comprises setting k equal to the DTX cycle period, then the CQI feedback rate is unaffected by the value of CQI_DTX_Priority provided that the transmission bursts of the DTX cycle align with the transmission times for CQI in the CQI feedback cycle. CQI_DTX_Priority is a parameter which controls whether the "off" period of the DTX cycle or the transmission of the CQI value takes precedence. For instance, if CQI_DTX_Priority=0, a CQI report will not be sent if the DTX pattern means that the control signalling should be switched off at that time. On the other hand, if CQI_DTX_Priority=1, a CQI report will be transmitted even if the DTX pattern indicates an "off" period.

More usefully, the DTX/DRX cycle period may be configured to be an integer multiple of the CQI feedback cycle period k. In this way the CQI feedback rate is reduced in the intervals between packet transmission, assuming an appropriate setting of the timer CQI_DTX_TIMER which controls the length of time after each packet for which CQI_DTX_Priority=1. This enables an increase in UE sleep time and reduction in interference. Thus, power is saved and interference is reduced. This is for instance illustrated by FIG. 1, which represents time graphs T11, T12 and T13, for an example having CQI feedback cycle period k=2 subframes with DTX period L=4 subframes, and when the CQI_DTX_Priority is 0. T11 represents the DTX pattern, which is high during a transmission phase, i.e. when data may be transmitted, and low otherwise. T12 represents the CQI reports scheduled in a normal use, i.e. not in CPC mode. Normally, a CQI report should be transmitted every second subframe. Finally, T13 represents the CQI reports actually transmitted, i.e. the CQI reports which coincide with a transmission phase of the DTX.

If the DTX cycle period L is longer than k and not an integer multiple of it, a more significant reduction in the CQI reporting rate will occur.

When the UE is not in MIMO mode, the skipping of certain CQI reports causes no particular problems (other than reduced availability of CQI) when the DTX cycle period is greater than k.

However, when the UE is in MIMO mode, multiple different types of CQI reports can be sent—for example two different types designated Type A and Type B, indicating the PCI/CQI (where PCI denotes Precoding Control Information, indicating a preferred beamforming weight for application at the transmitter) for the secondary station's preferred number of streams and the PCI/CQI for a single stream respectively. Therefore skipping some CQI reports due to the DTX cycle potentially has more impact and needs to be considered more carefully. Indeed, when the CPC is not configured, a typical CQI reporting pattern may comprise sending N TypeA reports out of every M reports (the remainder being Type B), where N/M can for example take the following values: {1/2, 2/3, 3/4, 4/5, 5/6, 6/7, 7/8, 8/9, 9/10, 1/1}.

This means that when the DTX cycle period is longer than k, it is highly likely that all the CQI reports of one type will be skipped if the DTX cycle period is an integer multiple of k as in non-MIMO mode.

For example, if N/M=1/2 as depicted on FIG. 2, then setting the DTX cycle period L to any multiple of k will result in either all the Type A reports being skipped or all the Type B reports being skipped (which type is skipped depends on the time offset between the DTX cycle and the cycle of the CQI feedback pattern). On time graph T23, only type A are transmitted and all the type B CQI reports from time graph T22, representing the schedule of transmission of the CQI reports, are skipped.

In general, setting the DTX cycle to any integer multiple of Mk will result in all the CQI reports of one type being skipped. For example, if N/M=3/4, setting the DTX cycle period to 4 k will cause all the transmitted CQI reports to be of the same type.

Reconfiguring N/M every time CQI_DTX_Priority changed would be impractical and is contrary to the spirit of CPC which avoids slow higher-layer signalling for transitions between normal and DTX modes.

Another possibility would be to configure two sets of N/M values when MIMO mode is configured for the secondary station. However, this is problematic as the second set of N/M is only needed when both CPC and MIMO are configured. The control signalling for these two features is independent, so there is no obvious control signalling message in which to include the second set of N/M values.

A solution is to define a Physical-Layer rule which prevents all of one type of CQI report being extinguished by the DTX cycle. One novel rule would be to make the type of the CQI reports when DTX is active depend on the actually-transmitted reports rather than the Connection Frame Number (CFN).

However, this would lose all relation to the Connection Frame Number. Indeed, the existing definition of which of Type A and Type B should be sent is derived directly from the Connection Frame Number which is known to both secondary and primary stations, so that the primary station knows exactly what type of CQI to expect in each frame. By losing all relation to the CFN, this would increase the probability of the primary station "losing synchronisation" with which type of CQI report the secondary station is sending, thus possibly increasing the error rate for the decoding of the CQI reports received at the primary station.

SUMMARY OF THE INVENTION

It is an object of the invention to propose a method of transmitting channel quality reports that is simple and permits to avoid a loss of synchronisation by the primary station of the type of channel quality reports transmitted by the secondary station.

It is another object of the invention to propose a method which permits to send all possible types of channel quality information within a predetermined time window. To this end, according to the invention, a method is proposed for transmitting channel quality reports periodically from a secondary station to a primary station, wherein transmission of a control channel is carried out discontinuously with a predetermined periodic transmission phase, said method comprising the steps of:

(a) scheduling transmission of a transmission sequence of channel quality reports of at least a first type and a second type according to a predetermined pattern,
(b) estimating the number of channel quality reports of the second type scheduled during the transmission phases of a predetermined time window,
(c) amending the transmission sequence by replacing at least one channel quality report scheduled to be of the first type with a channel quality report of the second type if the number of second type channel quality reports scheduled during the transmission phases of the predetermined time window is below a predetermined threshold
(d) transmitting the amended sequence to the primary station.

It is thus proposed to retain the existing periodic rule for transmitting the two types of channel quality reports according to the connection frame number (CFN), but additionally forcing one of the other-type CQI reports to be sent occasionally if the DTX pattern is otherwise excluding them. This method can be applied as well at the receiving side to receive the reports, so that the primary station cannot lose synchronisation. Moreover, this invention is simple to implement.

This method could also be restricted to apply only if the number of reports M is greater than the number than the number of type A reports N (i.e. not 1/1) and DTX_cycle$\geq$M.k' (i.e. the DTX cycle has the possibility to extinguish all CQI reports of one or other type).

According to the invention, if the predetermined sequence for transmitting each type of CQI coupled with the DTX cycle results in less than the total number of types of CQI being transmitted within a certain time window, some of the CQI reporting occasions are instead forcibly used for the types of CQI which would not otherwise be transmitted within the said window, regardless of the type of CQI indicated by the periodic rule.

According to another aspect of the invention, a primary station is proposed comprising:

receiving means for receiving periodic channel quality reports transmitted by a secondary station, wherein reception of a control channel is carried out discontinuously with a predetermined periodic reception phase, means for scheduling reception of a reception sequence of channel quality reports of at least a first type and a second type according to a predetermined pattern, means for estimating the number of channel quality reports of the second type scheduled during the reception phases of a predetermined time window, means for amending the reception sequence by replacing at least one channel quality report scheduled to be of the first type with channel quality report of the second type if the number of second type channel quality reports scheduled during the reception phases of the predetermined time window is below a predetermined threshold, wherein the receiving means are arranged to receive a sequence transmitted by the secondary station similar to the amended sequence.

According to a further aspect of the invention, a secondary station is proposed comprising:

means for transmitting channel quality reports periodically to a primary station, wherein transmission of a control channel is carried out discontinuously with a predetermined periodic transmission phase, means for scheduling transmission of a transmission sequence of channel quality reports of at least a first type and a second type according to a predetermined pattern, means for estimating the number of channel quality reports of the second type scheduled during the transmission phases of a predetermined time window, means for amending the transmission sequence by replacing at least one channel quality report scheduled to be of the first type with a channel quality report of the second type if the number of second type channel quality reports scheduled during the transmission phases of the predetermined time window is below a predetermined threshold, wherein the transmitting means are arranged to transmit the amended sequence to the primary station.

According to a further aspect of the invention, a method is proposed for receiving channel quality reports periodically from a secondary station to a primary station, wherein reception of a control channel is carried out discontinuously with a predetermined periodic reception phase, the method comprising steps of:

(a) scheduling reception of a reception sequence of channel quality reports of at least a first type and a second type according to a predetermined pattern,
(b) estimating the number of channel quality reports of the second type scheduled during the reception phases of a predetermined time window,
(c) amending the reception sequence by replacing at least one channel quality report scheduled to be of the first type with a channel quality report of the second type if the number of second type channel quality reports scheduled during the reception phases of the predetermined time window is below a predetermined threshold,
(d) decoding a signal received from the secondary station on the basis of the amended sequence.

These and other aspects of the invention will be apparent from and will be elucidated with reference to the embodiments described hereinafter.

Also according to the invention, a method is proposed for transmitting channel quality reports periodically from a secondary station to a primary station, wherein transmission of a control channel is carried out discontinuously with a predetermined periodic transmission phase, said method comprising the steps of:

(a) scheduling transmission of a transmission sequence of channel quality reports of at least a first type and a second type according to a first predetermined pattern,
(b) scheduling transmission of at least one channel quality report of at least one of the two types according to a second predetermined pattern,
(c) amending the transmission sequence by setting at least one channel quality report of the first predetermined pattern which coincides with at least one channel quality report of the second predetermined pattern to be of the type indicated by the second predetermined pattern regardless of the type indicated by the first predetermined pattern;
(d) transmitting the amended sequence to the primary station.

Advantageously, the second predetermined pattern has a period which is a multiple of the period of a periodic transmission pattern; in this case, the periodic transmission pattern of which the period of the second predetermined pattern is a multiple may advantageously be the period of the above predetermined periodic transmission phase, or a multiple of it, or a factor of it.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 4:
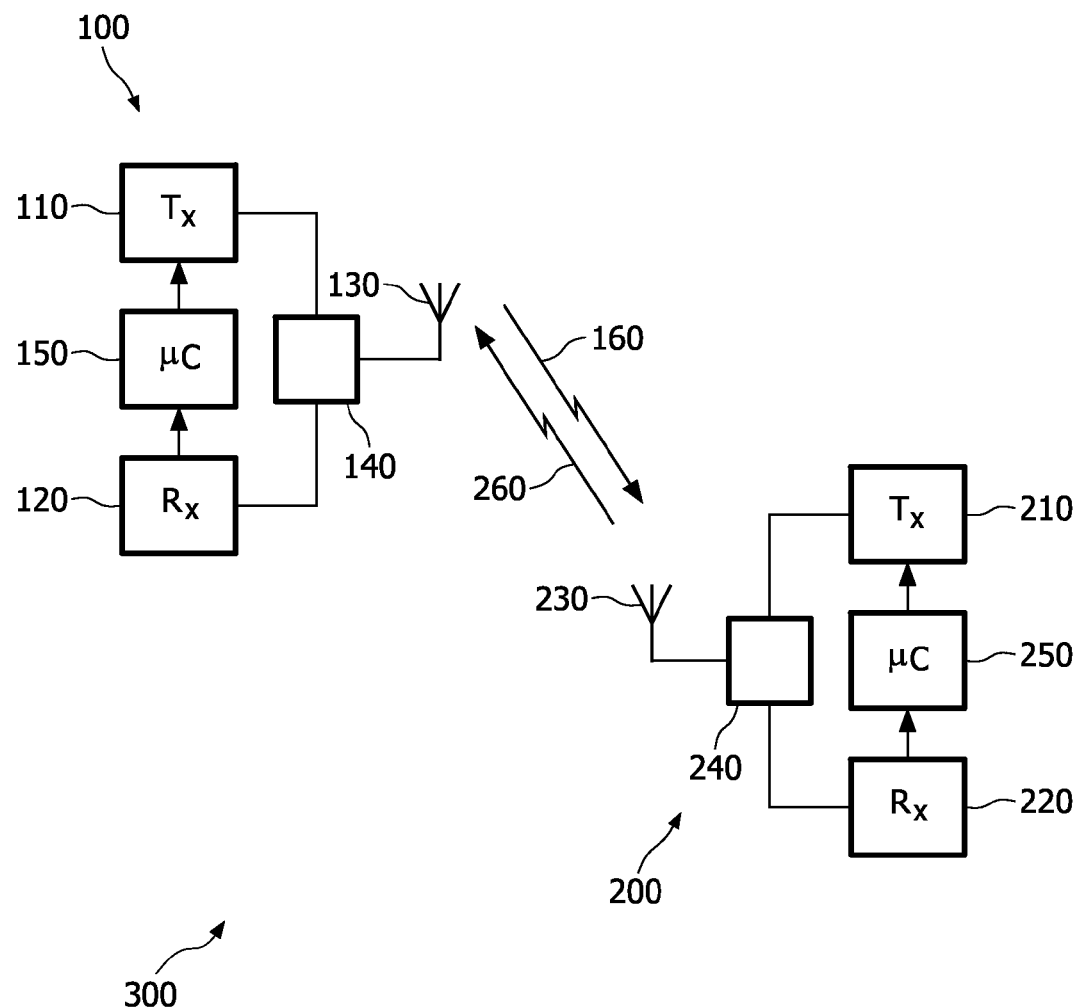
FIG. 4 is a block diagram representing a system of communication in accordance with the invention.

The present invention relates to a system of communication 300 as depicted in FIG. 4, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the first radio station 100 takes place on a second channel 260.

These primary and secondary stations are for instance respectively UMTS base station and mobile station, which are able to communicate according to a MIMO mode of communication. As explained before, two types of Channel Quality Feedback are to be sent from the secondary stations to the primary stations. These types can be:

Type A which indicates a value of channel quality for one stream, for example selected from about 30 values, if the secondary station would prefer to receive one stream or a value of channel quality for each of two streams, each selected from 15 values, if the UE would prefer to receive two streams; this information is represented by an 8-bit codeword; and Type B which indicates a value of channel quality for one stream, selected from about 30 values indicated by a 5-bit codeword.

Figure 1:
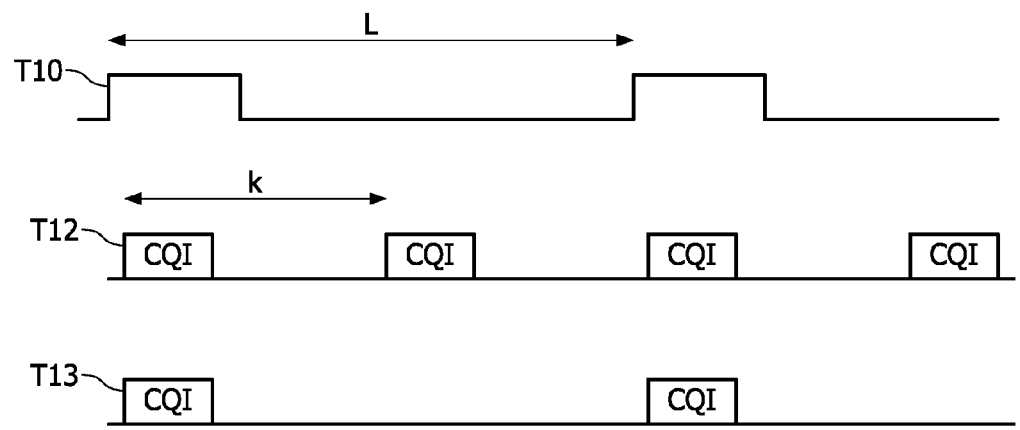
FIG. 1, already described, represents time graphs representing the transmission of reports for a conventional system of communication.
Figure 2:
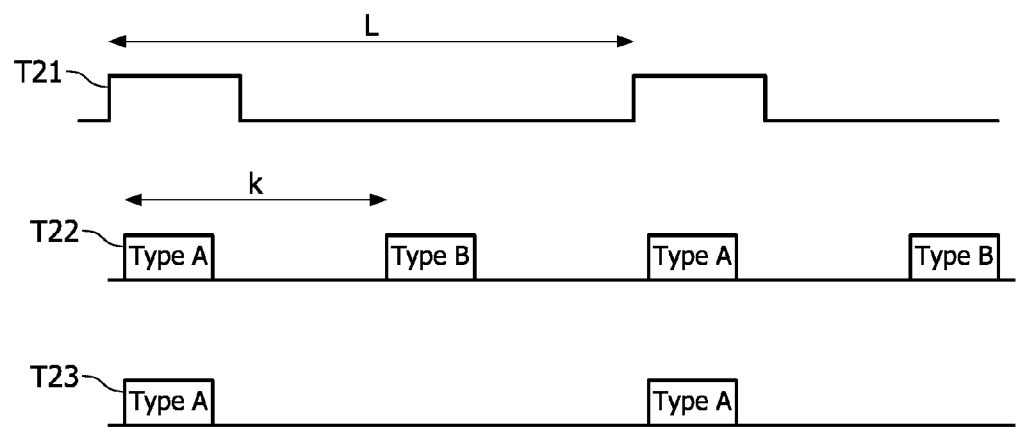
FIG. 2, already described, represents time graphs representing the transmission of reports for a conventional system of communication.
Figure 3:
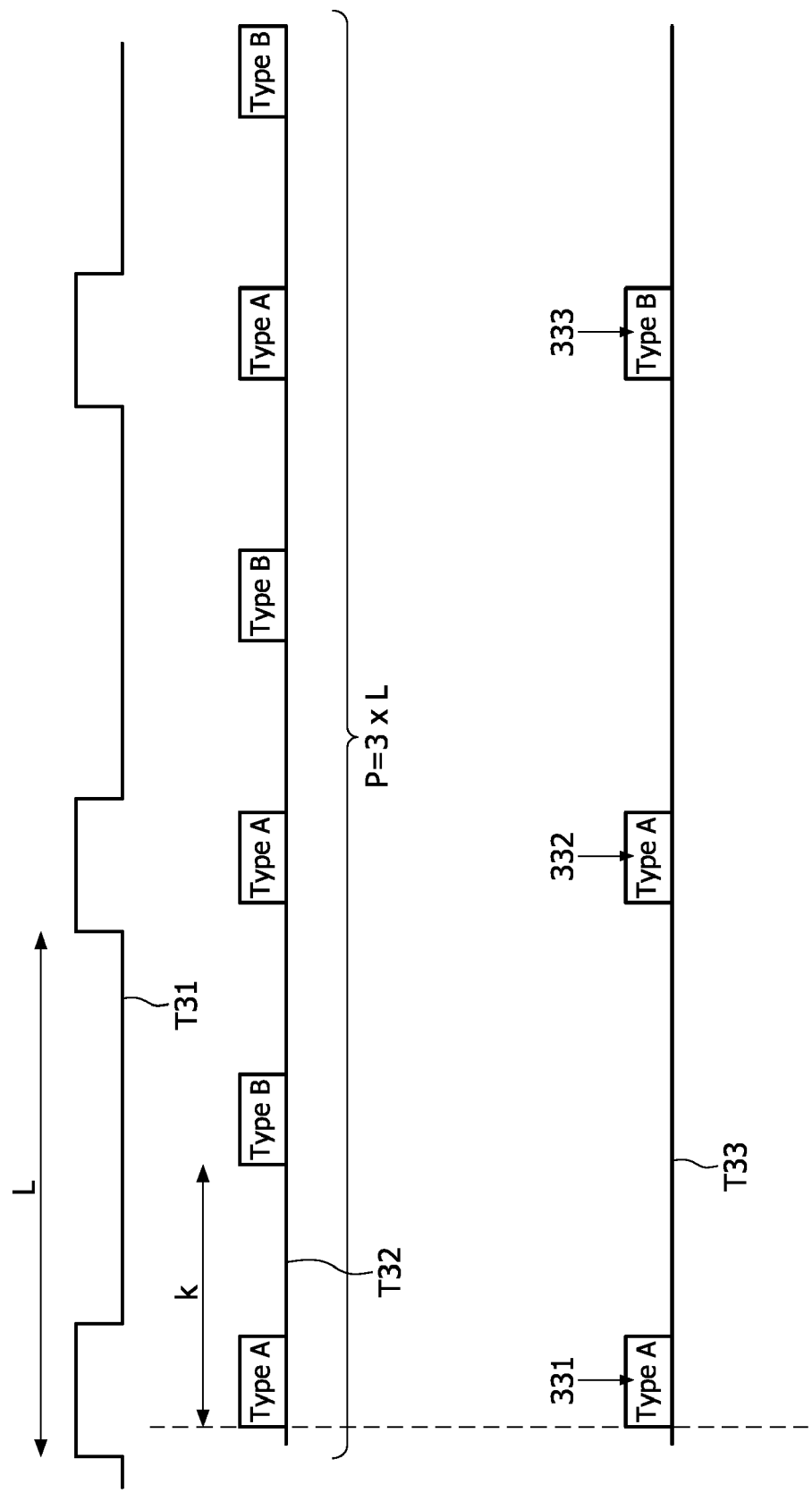
FIG. 3 represents time graphs representing the transmission of reports for a system of communication in accordance with the invention.

According to the invention, the secondary station schedules to send a sequence of channel quality reports see T32 on FIG. 3), indicating the quality of the streams of data, in a conventional manner. It then compares this scheduling with the DTX or Discontinuous transmission pattern (see T31), and estimates how many type A reports and type B reports will actually be sent because of this pattern within a predetermined time period. With this estimating, the secondary station knows if the number of each type will be sufficient, and if needed, it will amend the scheduling by replacing a $CO_3 1$ report of one type by a CQI report of another type.

Thus, in this embodiment, the secondary station uses the predetermined DTX cycle L and CQI feedback cycle k to predict the number of occasions on which it will be able to transmit channel quality reports in the said certain time window P, and on the basis of this prediction it determines according to the invention which of the CQI reporting occasions will be used for a type of CQI other than the type set by the predetermined CQI feedback cycle. The same rule may be applied at the Node B to assist reception of the CQI values.

In this example where two types of CQI are to be transmitted, namely Type A and Type B, an embodiment of the invention could employ the following rule for example:

if during a period P equaling 3L (L being the DTX_cycle length) only one type of CQI would be transmitted, the last transmitted CQI value in that period would automatically be of the other type.

The value "3" seems reasonable but could be different or configurable by signalling or other rules.

More specifically, as illustrated on FIG. 3, the scheduling T32 combined with the DTX pattern T31 leads to only sending type A CQI reports. Since no type B CQI reports would be sent, the schedule is amended as follows: the two first reports 331 and 332 remain type A reports, but the third report 333 is amended to a type B report. This CCU report would normally be Type A, but the period would then only contain Type A reports, so the last report is changed to Type B.

Thus, it ensures that all types of report are transmitted within the period P, but the pattern of CQI reports remains aligned to the Connection Frame Number (CFN).

The invention is not limited to only two different types of CQI reports and could be implemented in respect of a larger number of types.

Consider an example where T types of CQI are required to be transmitted according to a predetermined sequence, which may for example be periodic and/or take one of each type of CQI in turn, or a sequence of one or more values of one type of CQI followed by a sequence of one or more values of another type of CQI. In a particular time window (typically significantly longer than the DTX cycle), the predetermined sequence of CQI types combined with the predetermined DTX cycle may prevent transmission of x of the T types of CQI during the said time window. The secondary station therefore reserves x CQI transmission occasions and uses them to send one of each of the types of CQI that would otherwise not be able to be sent.

The x reserved CQI transmission occasions may for example be the last x occasions within the said time window, or the first in the next time window, or equally-spaced through the time window, or some other pattern.

A systematic relation can be given, so that the primary station and the secondary station are able to obtain always the same rescheduling. For instance, the normal CQI reporting pattern could be described as follows:

$$\text{If} \left\lfloor \frac{5 \times \text{CFN\_DRX} - \text{UE\_DTX\_DRX\_Offset} + FN}{k'} \right\rfloor \mod M\_cqi < N\_cqi\_typeA \text{ holds,}$$

where CFN_DRX represents the Connection Frame Number, UE_DTX_DRX_Offset represents an offset used in configuring the discontinuous transmission and discontinuous reception patterns, FN is the frame number, mod is the "modulo" mathematical function, M_cqi is the number of CQI within a time period and N_cqi_type A is the number of type A CQI reports within a predetermined period, then the UE shall report a type A CQI value. Otherwise, the UE shall report a type B CQI value, with the following exception according to an example of the invention:

if M_cqi>N_cqi_typeA and the current Uplink DPCCH Transmission Pattern Length, here denoted DTX_cycle_curr, is greater than or equal to M_cqi.k, then if only one type of CQI report would be transmitted during a period of length 3 x DTX_cycle_curr subframes beginning when ((CFN_DRX_UE_DTX_DRX_Offset+FN) mod (DTX_cycle_curr))=0, then the last transmitted CQI report in the above period of length 3 x DTX_cycle_curr subframes shall be of the type that would not otherwise be transmitted. The same behaviour may also be described in smaller units of time such as subframes, where for example one frame contains five subframes, in which case the above formula would become ((5*CFN_DRX−UE_DTX_DRX_Offset+SFN) mod (DTX_cycle_curr))=0 where SFN denotes the subframe number.

Moreover, it could be advantageous that the said certain time period and/or the said required number of each type of CQI report may be predetermined, or signalled by the network to the UE, or determined according to another rule: for example, depending on a measure of channel quality over some time period, or on the number or proportion of occasions on which the number of streams corresponding to a particular type of CQI has actually been transmitted or received, the UE and/or Node B may adjust the "required number" of each type of CQI report and/or the certain time period. For example, if a high proportion of transmissions within a time window have been dual-stream, the required number of CQI reports of the type corresponding to single-stream transmission may be reduced.

In an embodiment, the reports which are amended in the sequence are predetermined. For instance it can be the last reports of the time window, i.e. the report in the last transmission phase of the time window. On the other hand, this can alternatively be done in a following time window, for instance in the first transmission phase following the considered time window.

This method would for example only apply when the period of the discontinuous transmission L is longer than or equal to the period k of the scheduled transmission sequence of channel quality reports.

It is advantageous that the length of the predetermined time window P is a multiple of the period of the discontinuous transmission L. Similarly, the length of the predetermined time window P may be a multiple of the period of the scheduled transmission sequence of channel quality reports k.

In another embodiment, a particular CQI report within a predetermined time window is defined to be of a particular type regardless of whether any of the reports within the sequence within the predetermined time window would be of one of the types or not.

In one embodiment, the predetermined time windows could be arranged in groups, where a particular transmitted CQI report in the first predetermined time window of the pair was defined to be of one type, and a particular transmitted CQI report in another predetermined time window of the group is defined to be of another type. Advantageously, the groups may be pairs, where the first CQI report in the first window is of one type and the last CQI report in the second window is of the other type. Other positions could also be used, such as the first transmitted position in each window.

In the present specification and claims the word "a" or "an" preceding an element does not exclude the presence of a plurality of such elements. Further, the word "comprising" does not exclude the presence of other elements or steps than those listed.

The invention has been described in terms of CQI reporting from a secondary station to a primary station, but is equally applicable to other configurations such as reporting from a primary station to a secondary station or between peer nodes.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for transmitting channel quality reports periodically from a secondary station to a primary station, wherein transmission of a control channel is carried out discontinuously with a predetermined periodic transmission phase, said method comprising:
    (a) scheduling transmission of a transmission sequence of channel quality reports of at least a first type and a second type according to a predetermined pattern,
    (b) estimating a number of channel quality reports of the second type scheduled during transmission phases of a predetermined time window,
    (c) amending the transmission sequence by replacing at least one channel quality report scheduled to be of the first type with a channel quality report of the second type if the number of second type channel quality reports scheduled during the transmission phases of the predetermined time window is below a predetermined threshold,
    (d) transmitting the amended sequence to the primary station.

2. The method of claim 1, wherein in step (c) the at least one replaced first type channel quality report was scheduled during at least one predetermined periodic transmission phase of the predetermined time window.

3. The method of claim 2, wherein the at least one predetermined periodic transmission phases are last transmission phases of the predetermined time window.

4. The method of claim 1, wherein the at least one replaced first type channel quality report was scheduled during a predetermined periodic transmission phase after the predetermined time window.

5. The method of claim 4, wherein the at least one predetermined periodic transmission phases are first transmission phases after the predetermined time window.

6. The method of claim 1, wherein the predetermined threshold is one.

7. The method of claim 1, wherein the method only applies when the period of the discontinuous transmission is longer than or equal to the period of the scheduled transmission sequence of channel quality reports.

8. The method of claim 1, wherein the length of the predetermined time window is a multiple of the period of the discontinuous transmission.

9. The method of claim 1, wherein the length of the predetermined time window is a multiple of the period of the scheduled transmission sequence of channel quality reports.

10. The method of claim 1, wherein one of the types of channel quality report indicates a value for two data streams.

11. The method of claim 1, wherein one of the types of channel quality indicator indicates a value of channel quality for one stream.

12. A primary station comprising:
receiving means for receiving periodic channel quality reports transmitted by a secondary station, wherein reception of a control channel is carried out discontinuously with a predetermined periodic reception phase,
means for scheduling reception of a reception sequence of channel quality reports of at least a first type and a second type according to a predetermined pattern,
means for estimating a number of channel quality reports of the second type scheduled during reception phases of a predetermined time window,
means for amending the reception sequence by replacing at least one channel quality report scheduled to be of the first type with a channel quality report of the second type if the number of second type channel quality reports scheduled during the reception phases of the predetermined time window is below a predetermined threshold,
wherein the receiving means are arranged to receive a sequence transmitted by the secondary station similar to the amended sequence.

13. A secondary station comprising:
means for transmitting channel quality reports periodically to a primary station, wherein transmission of a control channel is carried out discontinuously with a predetermined periodic transmission phase,
means for scheduling transmission of a transmission sequence of channel quality reports of at least a first type and a second type according to a predetermined pattern,
means for estimating the number of channel quality reports of the second type scheduled during the transmission phases of a predetermined time window,
means for amending the transmission sequence by replacing at least one channel quality report scheduled to be of the first type with a channel quality report of the second type if the number of second type channel quality reports scheduled during the transmission phases of the predetermined time window is below a predetermined threshold,
wherein the transmitting means are arranged to transmit the amended sequence to the primary station.

14. A method for receiving channel quality reports periodically from a secondary station to a primary station, wherein reception of a control channel is carried out discontinuously with a predetermined periodic reception phase, the method comprising
(a) scheduling reception of a reception sequence of channel quality reports of at least a first type and a second type according to a predetermined pattern,
(b) estimating a number of channel quality reports of the second type scheduled during reception phases of a predetermined time window,
(c) amending the reception sequence by replacing at least one channel quality report scheduled to be of the first type with a channel quality report of the second type if the number of second type channel quality reports scheduled during the reception phases of the predetermined time window is below a predetermined threshold,
(d) decoding a signal received from the secondary station on the basis of the amended sequence.

15. A primary station comprising:
a receiver configured to receive periodic channel quality reports transmitted by a secondary station, wherein reception of a control channel is carried out discontinuously with a predetermined periodic reception phase,
a processor communicating with the receiver and programmed to perform the acts of:
scheduling reception of a reception sequence of channel quality reports of at least a first type and a second type according to a predetermined pattern,
estimating a number of channel quality reports of the second type scheduled during reception phases of a predetermined time window,
amending the reception sequence by replacing at least one channel quality report scheduled to be of the first type with a channel quality report of the second type if the number of second type channel quality reports scheduled during the reception phases of the predetermined time window is below a predetermined threshold,
a transmitter communicating with the processor and configured to receive information at least from secondary stations, and
wherein the receiver is arranged to receive a sequence transmitted by the secondary station similar to the amended sequence.

16. A secondary station comprising:
a transmitter configured to transmit channel quality reports periodically to a primary station, wherein transmission of a control channel is carried out discontinuously with a predetermined periodic transmission phase,
a processor communicating with the transmitter and programmed to perform the acts of:
scheduling transmission of a transmission sequence of channel quality reports of at least a first type and a second type according to a predetermined pattern,
estimating the number of channel quality reports of the second type scheduled during the transmission phases of a predetermined time window,
amending the transmission sequence by replacing at least one channel quality report scheduled to be of the first type with a channel quality report of the second type if the number of second type channel quality reports scheduled during the transmission phases of the predetermined time window is below a predetermined threshold,
a receiver communicating with the processor and configured to receive information at least from primary stations, and
wherein the transmitter is arranged to transmit the amended sequence to the primary station.

* * * * *